United States Patent [19]

Sorenson et al.

[11] 4,094,301
[45] June 13, 1978

[54] SOLAR COLLECTOR PANEL

[76] Inventors: Edward Fredrick Sorenson, 998 Barrett, Chula Vista, Calif. 92011; Edward Fredrick Sorenson, Jr., 10136 Swanton Dr., Santee, Calif. 92071

[21] Appl. No.: 668,441

[22] Filed: Mar. 19, 1976

[51] Int. Cl.² ............................................. F24J 3/02
[52] U.S. Cl. .................................. 126/271; 237/1 A; 126/270; 165/171
[58] Field of Search ............... 126/270, 271; 237/1 A; 138/103, 106, 110; 165/171; 49/488, 483; 52/398, 399, 400, 616; 29/157.3 C, 157.3 R; 248/68 R, 74 A

[56] References Cited

U.S. PATENT DOCUMENTS

| 2,408,253 | 9/1946 | Diebold | 138/110 X |
| 3,039,453 | 6/1962 | Andassy | 165/171 X |
| 3,215,134 | 11/1965 | Thomason | 126/271 |
| 3,254,703 | 6/1966 | Thomason | 126/271 X |
| 3,680,276 | 8/1972 | Wright et al. | 52/398 |
| 3,886,998 | 6/1975 | Rowekamp | 126/271 X |
| 3,898,979 | 8/1975 | Medico, Jr. | 126/271 |
| 3,952,725 | 8/1976 | Edmondson | 126/271 |
| 3,972,317 | 8/1976 | Gallagher | 126/271 |
| 3,985,117 | 10/1976 | Sallen | 126/271 |

Primary Examiner—William F. O'Dea
Assistant Examiner—Larry Jones
Attorney, Agent, or Firm—Brown & Martin

[57] ABSTRACT

Heat absorbing sheet sections with corrugated surfaces terminate in part cylindrical flanges. The flanges are pressed between spaced heat collection tubes and held in place by spring action. The combined structure forms a heat absorbing surface and is secured within a pan having integral bottom and upraised sides. A seal molding is secured on the upraised sides of the pan and mounts two glass panels over the heat absorbing surface. A peripheral slot is formed in the seal molding. A key is pressed fit into the peripheral slot to hold the glass panels and molding in position.

10 Claims, 8 Drawing Figures

U.S.Patent  June 13, 1978  4,094,301

SOLAR COLLECTOR PANEL

BACKGROUND OF THE INVENTION

Flat plate solar collectors are the most common form of solar heating devices. In their most basic form, such collectors comprise a plurality of heat collection tubes on a black heat absorbing surface. Such a basic flat plate device is relatively inefficient and thereby requires an excessively large surface area to produce substantial quantities of heat.

Various techniques for increasing the efficiency of flat plate collectors have been proposed. Accordingly, in one such approach, a glass panel overlies the heat absorbing surface. Such a glass panel passes the ultra violet rays from the sun which are converted into heat energy. Most of the infrared radiation from the heat absorbing surface is reflected back to the surface by the glass panel, thereby increasing the precentage of the sun's energy converted into useful heat. Another known technique is to make the heat collection tubes integral with the heat absorbing surface to increase the heat transfer to water flowing in the heat collection tubes.

Techniques such as those outlined above and similar techniques may increase the efficiency of a flat plate solar collector to a level where sufficient heat is generated to accomplish various household heating and air conditioning requirements. However, the increase in the cost of materials for such complex flat plate solar collectors together with the incremental cost of installation renders the final product so expensive that such devices are frequently not cost effective as compared with conventional fuel heaters.

A further deficiency of prior art flat plate solar collectors is their inability to effectively respond over a wide range of incident sun angles. Such devices must be mounted and actuated so that they can follow the sun or must accept extremely low efficiencies during the extremes of sun travel. Additionally, in those flat plate solar collectors utilizing a glass panel to reduce radiation losses, there has been no effective mechanism for reducing convective and conductive heat losses from the solar panel.

Therefore, it is desirable to have a solar collector panel that is relatively inexpensive to manufacture and assemble and which provides for a highly efficient conversion of sun energy into heat and which transfers the converted heat efficiently to water flowing through the panel. Such a solar collector panel is particularly desirable where convective and conductive heat losses from the panel are minimized.

SUMMARY OF THE INVENTION

An exemplary embodiment of the invention incorporates a unitary pan with upraised side walls and end walls. A ledge is formed approximately half way up the walls of the pan for reinforcing and stiffening the walls. The heat absorbing surface is formed from plural sheet sections. Each of the sheet sections incorporate a corrugated surface terminating in a part-cylindrical flanges. The part cylindrical flanges are sized so that two mating part cylindrical flanges accommodate between them a heat collector tube. To insure good heat transfer contact between the heat collection tube and sheets sections, a compliant material such as heat conductive adhesive, is applied between the heat collection tube and part cylindrical flanges. Manifold tubes are connected to the opposite ends of the heat collection tubes. The sheet sections are pressed between adjacent collection tubes and held in place by spring action. The assembled sheet sections and tubes are lowered in place onto a layer of insulation in the pan.

A seal molding incorporates a downward facing slot to accommodate the upward extending walls of the pan and inward facing slots to accommodate spaced glass panels. The molding is fitted over the edges of the glass panels and then pressed onto the edges of the pan. An outward facing slot in the seal molding is positioned between the inward facing slots and accommodates a resilient key member. The key member has protruding ears adjacent its inner end so that when it is pressed into the slot it expands and compresses the seal molding causing the seal molding to grip against the edges of the glass panels and the upper edge of the pan.

The resulting solar collector panel is quickly assembled with a minimum of tools and assembler skill. There are no close tolerances that must be held in the assembling process, and yet the finished panel is a highly insulative and highly efficient collector panel. The corrugated surface increases the surface area exposed to the sun and insures that a portion of the surface faces directly at the sun over a wide range of sun angles.

It is therefore an object of the invention to provide a new and improved solar collector panel.

It is another object of the invention to provide a new and improved solar collector panel which is relatively low in cost.

It is another object of the invention to provide a new and improved solar collector panel that may be easily assembled and installed.

It is another object of the invention to provide a new and improved solar collector panel with reduced convective and conductive heat loss.

It is another object of the invention to provide a new and improved solar collector panel with improved heat transfer from the heat absorbing surfaces to the heat collection tubes.

Other objects and many attendant advantages of the invention wil become more apparent upon a reading of the following detailed description together with the drawings in which like reference numerals refer to the like parts throughout and in which.

DETAILED DESCRIPTION OF THE DRAWINGS

Figure 1:
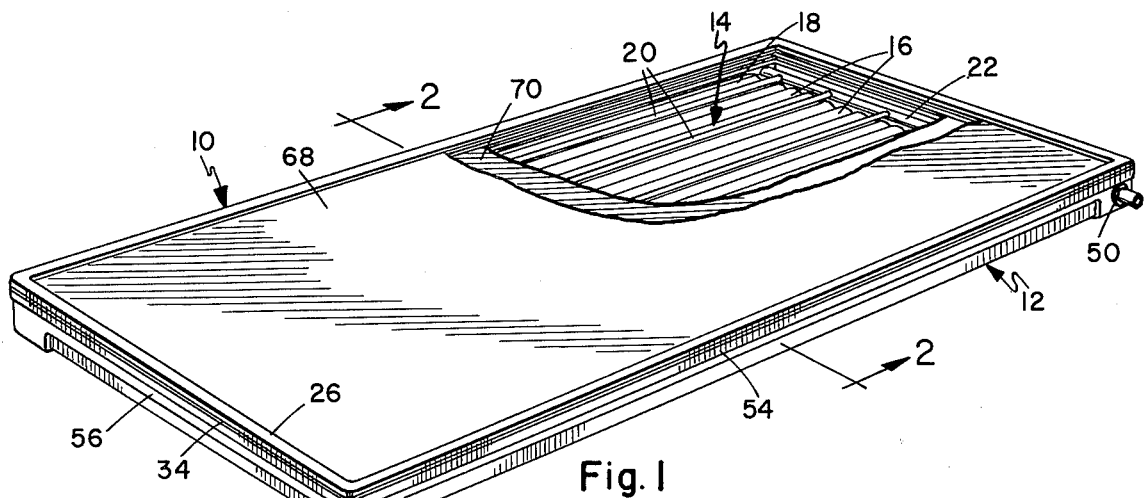
FIG. 1 is a perspective view, partially cut away, of the complete panel.
Figure 2:
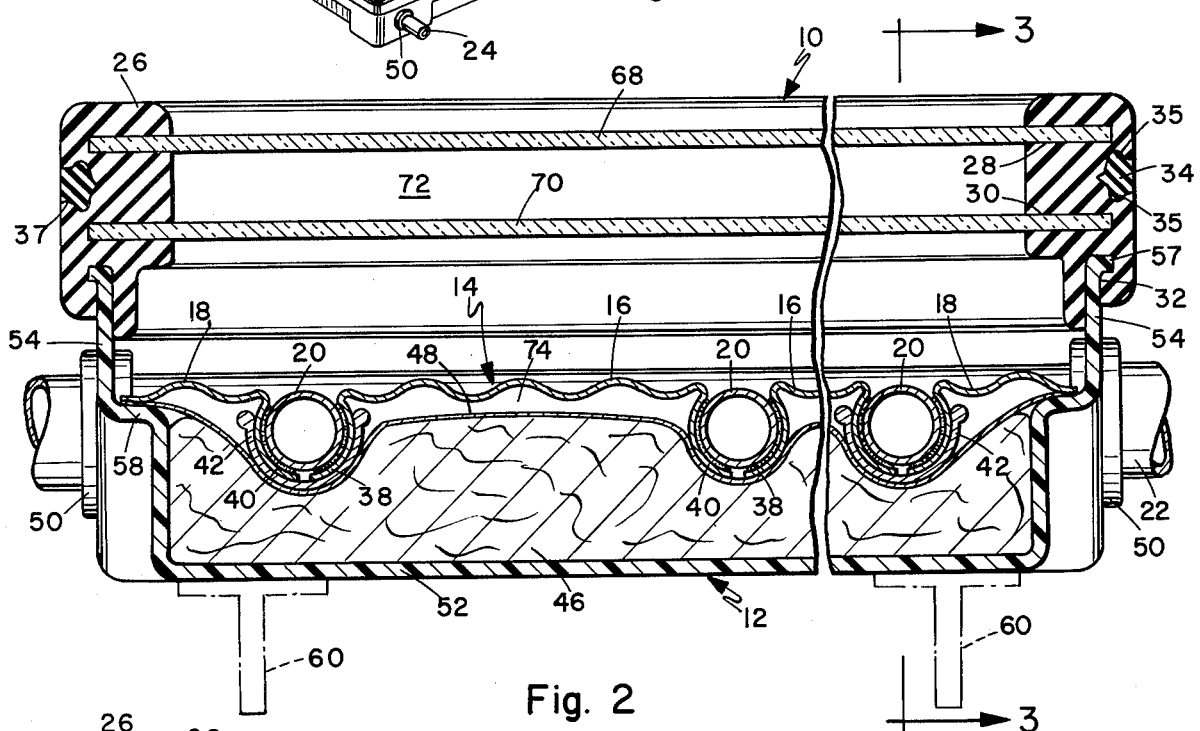
FIG. 2 is an enlarged sectional view taken on line 2—2 of FIG. 1.
Figure 3:
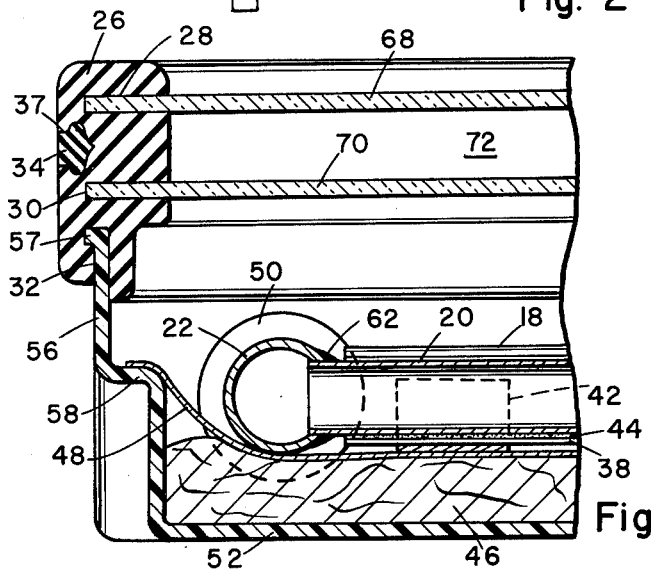
FIG. 3 is a sectional view taken on line 3—3 of FIG. 2.
Figure 4:
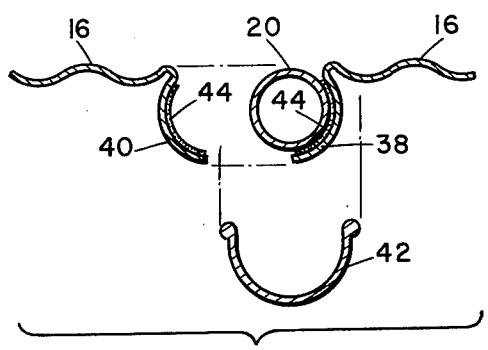
FIG. 4 is an exploded sectional view of a typical joint of sheet sections to a heat collection tube.

Referring now to the drawings, there is illustrated the solar collector panel 10 according to the invention. The principal components of the panel 10 include the generally rectangular pan 12, heat absorbing surface 14, heat collector tubes 20, seal molding 26 and glass panels 68 and 70. A plurality of heat collection tubes 20 are received in manifold tubes 22 and 24. The heat collection tubes 20 are secured in place by solder 62, or similar means.

The heat absorbing surface 14 is formed from heat absorbing sheet sections 16 together with edge sheet sections 18 and the upper surface of the heat collector tubes 20. Sheet sections 16 terminate in left and right part-cylindrical flanges 40 and 38 that conform closely to the outer configuration of the heat collector tubes 20. Sheet sections 16 are pressed between adjacent heat collection tubes 20 so that the flanges snap in place. Spring action and the conforming surfaces of the flanges 38 and 40 and the tubes 20 provide a good structural and heat conductive relationship. In assembled relationship, there is only a small gap between the terminal portions of flanges 38 and 40. Thus, thermal or other stresses that would otherwise warp the surface 14 are countered by additional resistance if the flanges 38 and 40 are forced into contact.

Sheet sections 18 have a single part cylindrical flange 40 or 38. The sheet sections 18 are joined to adjacent sheet sections by a plurality of clips 42. The clips 42 are generally U-shaped and are forced over the combined flanges 38 and 40.

A compliant material 44 with good heat conductive properties is interposed between the flanges 38 and 40 and heat collector tubes 20 for purposes to be described more fully hereinafter.

The pan 12 forms the base for the panel 10 and includes upright side walls 54, end walls 56 and pan bottom 52. The ledge 58 is formed into the side walls 54 and end walls 56 for stiffening. In assembled relationship, the heat absorbing surface 14 is spaced from the bottom 52 of pan 12. The space between the heat absorbing surface 14 and pan bottom 52 is filled with insulation, such as fiberglass insulation 46, having an upper reflective cover 48, such as metal foil material. The upper reflective cover 48 is contacted by the downwardly extending collector tube joints and therefore is held in spaced relationship from the sheet sections 16 and 18.

The seal molding 26 is formed of a resilient material, such as rubber, and suspends the glass panels 68 and 70 above the heat absorbing surface 14. A vertical slot 32 along the lower edge of the seal molding 26 is sized to fit over the upper terminal edges of the side walls 54 and end walls 56 and to accommodate the lip 57. Horizontal slots 28 and 30 are positioned along the vertical extent of the seal molding 26 for mounting the glass panels 68 and 70. Molding 26 seals against the edges of the glass panels 68 and 70 and the upper terminal portions of the side walls 54 and end walls 56 to seal the solar collector panel against the admission of contaminants. The security of the glass panels 68 and 70 in the seal molding 26 and te seal molding on the walls 54 and 56 is enhanced by the use of a hard rubber key 34. The inner end of the key 34 incorporates opposed ears 35. The key is driven into a peripheral slot 37 in the outer wall of the seal molding 26. The rubber key 34 is harder than that of the seal molding 26. Therefore, the ears 35 force a compression of the seal molding 26 along the outer edge. The compression frictionally engages and holds the glass panels 68 and 70 in position and engages the lip 57 to hold the molding 26 on the walls 54 and 56.

The completed solar collector panel is mounted on an inclined roof or similar structure by suitable supports 60.

The rapid manufacture, assembly and installation of the solar collector panel is facilitated by the design of the panel. The unitary pan member 12 may be formed in a single vacuum molding process from polycarbonate plastic, or comparable material. The heat collection tubes 20 may be soldered as a group to the manifold tubes 22 and 24. Heat absorbing sheet sections 16 and 18 may be black coated aluminum. The sections 14 are assembled to the heat collector tubes 20 after first coating the heat collector tubes with a heat conductive compliant material 44. The material 44 may be a time setting adhesive or may remain compliant after application. The sheet sections 16 are pressed over and snap in place on the coated tubes 20. The structural connection of the sheet sections 18 is obtained by applying the clips 42 at spaced points along each of the heat collection tubes 20 to hold the pary cylindrical flanges 38 and 40 against the compliant material 44 surrounding the heat collection tube 20. The spring bias of the clips 42 on sheet sections 18 together with the ability of the compliant material to fill in voids and accommodate irregularities, results in a substantially continuous heat conductive contact between the sheet sections 16 and 18 and the heat collection tubes 20.

The layer of fiberglass insulation 46, with a reflective upper cover 48, is placed in pan 12 and the assembled heat absorber panel 14 is placed on top of the insulation. Since the manifold tubes 22 and 24 are secured through grommets 50 and cannot move vertically or horizontally, the entire assembly is held securely in position. The glass panels 68 and 70 are forced into the slots 28 and 30 respectively and then the entire assembly placed over the walls 54 and 56 of the pan 12. The glass panels and molding are locked in position by forcing the key 34 into the peripheral slot 37 in the seal molding 26, thus completing the assembly of the panel.

In use, the solar collector panel is connected to similar units so that water is circulated from one manifold to such as manifold tube 22 through the heat collection tubes and exits the other manifold tube, such as manifold tube 24. Radiation energy from the sun passes through the transparent glass panels 68 and 70 and impinges upon the sheet sections 16 and 18 and upon the upper exposed surface of the heat collection tubes 20. The black coloration of the surface absorbs a substantial part of the sun's energy and converts the energy into heat. Thus, the surface of the heat absorber 14 reaches temperatures of as much as 100° or more above ambient. In a conventional panel, a considerable portion of the converted heat is lost due to convection, conduction and radiation losses. However, according to the invention, the heated surface and heat collection tubes are insulated from the surrounding environment. The glass panels 70 reflect and return infrared radiation from the heated surfaces. At the same time, the air gap 72 between the glass panels 68 and 70 forms a barrier against convective and conductive heat losses. Similarily, the reflective surface 48 returns radiated energy from the heated surfaces to the interior of the device. Since the reflective surface is spaced from the heated surfaces, there is a second air gap 74 which acts as another thermal barrier. Insulation 46 further reduces convective and conductive losses from the underside of the heat absorber surface.

Having described our invention, we now claim:

1. A solar collector panel comprising:
   a heat absorbing surface,
   plural heat collector tubes in the heat conducting relationship with said heat absorbing surface,
   manifold tubes connected to the opposite ends of said heat collector tubes,
   said heat absorbing surface and said heat collector tubes being mounted on a base,
   said base having an upper vertical edge,
   at least one glass panel, a seal molding secured over the upper edge of said base and positioning said glass panel above said heat absorbing surface, said heat absorbing surface comprising means including a plurality of sheet sections having part cylindrical end flanges for producing a spring action against said heat collection tubes and holding said sheet sections in position on said tubes, substantially U-shaped clips secured over the junctions of at least one of said flanges and holding said sheet sections in heat conducting relationship with said heat collector tubes.

2. The solar collector panel according to claim 1 wherein:

said heat absorbing surface comprises black coated sheet material having a corrugated surface.

3. The solar collector panel according to claim 1 wherein:

said base comprises a pan having an integral bottom portion, upraised side walls and end walls.

4. The solar collector panel according to claim 3 wherein:

said heat absorbing surface is supported in said pan above said bottom portion.

5. The solar collector panel according to claim 4 and including:

a layer of insulation between said bottom of said pan and said heat absorbing sheet.

6. The solar collector panel according to claim 5 wherein:

said insulation is spaced from said heat absorbing sheet by an air space, and heat reflective material between said insulation and said heat absorbing sheet.

7. A solar collector panel comprising:

a heat absorbing surface, plural heat collector tubes in the heat conducting relationship with said heat absorbing surface, manifold tubes connected to the opposite ends of said heat collector tubes, said heat absorbing surface and said heat collector tubes being mounted on a base, said base having an upper vertical edge, at least one glass panel, a seal molding secured over the upper edge of said base and positioning said glass panel above said heat absorbing surface, said heat absorbing surface including a plurality of sheet sections having part cylindrical end flanges, each of said heat collector tubes being in heat conducting contact with said flanges at the junction of said sheet sections, heat conducting compliant material between said heat conducting tubes and said sheet sections, substantially U-shaped clips secured over the junctions of at least one of said flanges and holding said sheet section in heat conducting relationship with said heat collector tubes.

8. The solar collector panel according to claim 7 wherein:

said heat absorbing surface comprises black coated sheet material having a corrugated surface.

9. The solar collector panel according to claim 7 wherein:

said base comprises a pan having an integral bottom portion and upraised side walls and end walls.

10. The solar collector panel according to claim 9 wherein:

said heat absorbing surface is supported in said pan above said bottom portion.

* * * * *